United States Patent
Teraoka et al.

(10) Patent No.: US 7,958,981 B2
(45) Date of Patent: Jun. 14, 2011

(54) SHOCK ABSORBER

(75) Inventors: Takashi Teraoka, Tokyo (JP); Tatsuya Masamura, Tokyo (JP); Futoshi Yoshida, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 1137 days.

(21) Appl. No.: 11/442,318

(22) Filed: May 30, 2006

(65) Prior Publication Data

US 2006/0283675 A1 Dec. 21, 2006

(30) Foreign Application Priority Data

Jun. 6, 2005 (JP) ................................. 2005-164984
Sep. 12, 2005 (JP) ................................. 2005-263221

(51) Int. Cl.
*F16F 9/34* (2006.01)
*F16F 9/48* (2006.01)
(52) U.S. Cl. ................... 188/322.15; 188/298
(58) Field of Classification Search ............. 188/322.15, 188/298

See application file for complete search history.

(56) References Cited

U.S. PATENT DOCUMENTS

| | | | | |
|---|---|---|---|---|
| 3,570,635 A * | 3/1971 | Takagi | ........................... | 188/280 |
| 3,896,908 A * | 7/1975 | Petrak | ........................... | 188/280 |
| 4,765,446 A * | 8/1988 | Murata et al. | ............. | 188/282.4 |
| 5,129,488 A * | 7/1992 | Furuya et al. | ............. | 188/282.6 |
| 5,248,014 A | 9/1993 | Ashiba et al. | | |
| 5,316,114 A * | 5/1994 | Furuya et al. | ............. | 188/266.4 |
| 5,368,142 A * | 11/1994 | Ashiba et al. | ............. | 188/282.1 |
| 5,386,892 A * | 2/1995 | Ashiba | ....................... | 188/282.8 |
| 6,220,409 B1 | 4/2001 | Deferme et al. | | |
| 6,561,326 B2 * | 5/2003 | Gotz | ........................ | 188/322.15 |
| 2004/0149530 A1 * | 8/2004 | Drees | ....................... | 188/322.15 |
| 2005/0011712 A1 | 1/2005 | Gotz et al. | | |
| 2005/0056506 A1 | 3/2005 | Deferme | | |

FOREIGN PATENT DOCUMENTS

| | | |
|---|---|---|
| DE | 10300107 | 5/2004 |
| DE | 10258815 | 7/2004 |
| DE | 10 2004 014395 | 11/2004 |
| EP | 1152166 | 11/2001 |
| JP | 7-19642 | 4/1995 |
| JP | 2000-356237 | 12/2000 |

* cited by examiner

*Primary Examiner* — Bradley T King
*Assistant Examiner* — Mahbubur Rashid
(74) *Attorney, Agent, or Firm* — Rabin & Berdo, PC

(57) ABSTRACT

A shock absorber interposed in parallel with a suspension spring between a vehicle wheel and a vehicle body of a vehicle comprises a main piston (2) partitioning a cylinder (1) into a first operating chamber (R1) and a second operating chamber (R2), and connected to a piston rod (8). The first operating chamber (R1) and the second operating chamber (R2) are connected by a laminated leaf valve (V1, V2) under a first flow resistance. A passage (4a) connects one of the pressure chambers (R3A, R3B) partitioned by a free piston (5) and the first operating chamber (R1) under a second flow resistance. A passage (4b) connects the other of the pressure chambers (R3A, R3B) and the second operating chamber (R2) under a third flow resistance. The shock absorber displays stable damping force characteristics as a result of a spring (S) supporting the free piston (5) in a predetermined neutral position.

18 Claims, 14 Drawing Sheets

SHOCK ABSORBER

FIELD OF THE INVENTION

This invention relates to a shock absorber for a vehicle.

BACKGROUND OF THE INVENTION

A shock absorber is disclosed respectively by US2005/0011712A1 published by the United States Patent and Trademarks Office in 2005, JPH07/019,642U1 published by the Japan Patent Office in 1995 and JP2000-356237A1 published by the Japan Patent Office in 2000. Each of these shock absorbers comprises a cylinder, a main piston partitioning the cylinder into two operating chambers, a passage provided in the main piston and connecting with the two operating chambers and two pressure chambers divided by a free piston and connected respectively with the two operating chambers.

These shock absorbers produce a relatively small damping force as a result of small-amplitude vibration due to the displacement of working oil between the pressure chambers and the operating chambers in response to the displacement of the free piston. Conversely large-amplitude vibrations result in the free piston displacing to the end of a stroke and thus working oil can not move between each operating chamber and the corresponding pressure chamber. In this case, the working oil moves directly between the two operating chambers through the passage provided through the main piston. The provision of a resistance element such as a leaf valve in the passage produces a large damping force.

Thus the shock absorbers rapidly increase the damping force when the free piston reaches the end of the stroke. The prior art shock absorbers provide a cushion projecting in the direction of displacement of the free piston in order to mitigate a sharp variation in the damping force. When the free piston has almost reached the end of the stroke, the cushion abuts with the wall of the pressure chamber. Consequently the displacement of the free piston is gradually impeded and the damping force undergoes a gradual increase.

SUMMARY OF THE INVENTION

A shock absorber for a vehicle is required to prevent rolling of the vehicle by producing a large damping force with respect to relatively low-frequency vibrations input to the shock absorber when the vehicle runs on a curved road. On the other hand, it is required to suppress the transmission of vibrations to the vehicle body as a sprung weight with respect to the vehicle suspension system, by producing a small damping force with respect to relatively high-frequency vibrations resulting from the vehicle travel over the undulated portions of the road surface.

The prior-art shock absorbers substantially meet the requirements above by varying the damping force in response to the amplitude of the input shock. However a shock absorber which produces a damping force in response to amplitude can not cope with a situation for example which requires the production of a large damping force with respect to an input shock having a small amplitude.

It is therefore an object of this invention to vary a damping force in response to the frequency of a vibration and to adapt a shock absorber to cope with the characteristics of such a vibration.

Further, in US2005/0011712A1, a neutral position of the free piston does not always correspond with the neutral position of the main piston. Consequently, it is difficult to accurately control the timing at which sharp variations in the damping force occur. Generally a shock absorber for a vehicle produces a differential pressure of several megapascals between one operating chamber and the other operating chamber during the expansion and contraction strokes. In order to suppress sharp variation in the damping force by a cushion mounted onto the free piston, it is necessary to set the spring constant of the cushion to a high value. Conversely it is difficult to design a cushion with the required durability characteristics.

It is therefore another object of this invention to provide a shock absorber which reduces manufacturing costs by simplifying design and which accurately suppresses sharp variation in the damping force.

In order to achieve the above objects, this invention provides a shock absorber interposed in parallel with a suspension spring between a vehicle wheel and a vehicle body of a vehicle. The shock absorber comprises a cylinder, a main piston partitioning the cylinder into a first operating chamber and a second operating chamber, a first connecting mechanism connecting the first operating chamber and the second operating chamber under a first flow resistance, two pressure chambers partitioned by a free piston which has a predetermined pressure receiving area, a second connecting mechanism connecting the first operating chamber with one of the two pressure chambers under a second flow resistance, a third connecting mechanism connecting the second operating chamber with the other of the two pressure chambers under a third flow resistance, and a spring having a predetermined spring constant and resiliently supporting the free piston in a predetermined neutral position.

The details as well as other features and advantages of this invention are set forth in the remainder of the specification and are shown in the accompanying drawings.

DESCRIPTION OF THE PREFERRED EMBODIMENTS

Figure 1:
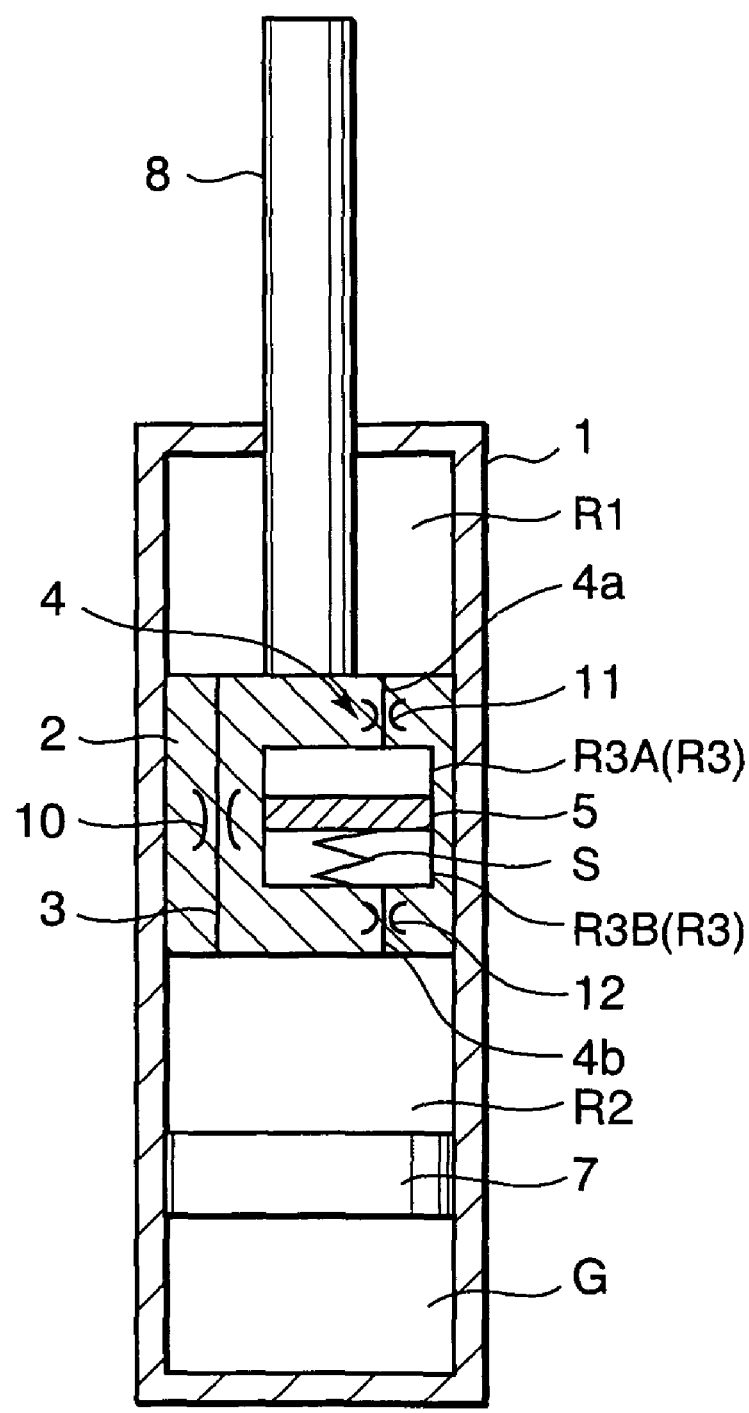
FIG. 1 is a schematic diagram of a shock absorber according to this invention.

Referring to FIG. 1 of the drawings, a shock absorber for a vehicle comprises a cylinder 1, a main piston 2 sliding in the cylinder 1 and partitioning the cylinder 1 into two operating chambers, and a piston rod 8 projecting outwardly from the cylinder 1 and connected to the main piston 2. The two operating chambers are designated as an upper operating chamber R1 above the main piston 2 and a lower operating chamber R2 below the main piston 2.

The upper operating chamber R1 and the lower operating chamber R2 are connected through a first passage 3 provided in the main piston 2.

A cylindrical pressure chamber R3 is provided in the main piston 2 and a free piston 5 is housed therein. The pressure chamber R3 is partitioned by the free piston 5 into an upper pressure chamber R3A and a lower pressure chamber R3B. Working oil fills the upper operating chamber R1, the lower operating chamber R2, the upper pressure chamber R3A and the lower pressure chamber R3B.

The free piston 5 is resiliently supported at a neutral position by a spring S.

The upper pressure chamber R3A and the upper operating chamber R1 are placed in communication by a second passage 4a provided with an orifice 11. The lower pressure chamber R3B and the lower operating chamber R2 are placed in communication by a third passage 4b provided with an orifice 12. Although the passages 4a and 4b do not communicates with each other due to the free piston 5 which separates these passages 4a, 4b, an equal amount of working oil corresponding to the displacement speed of the free piston 5 flows simultaneously in these passages 4a, 4b.

A gas chamber G is partitioned by a free piston 7 below the main piston 2 of the cylinder 1. The gas chamber G is filled with a gaseous body. As a result, the gas chamber G can absorb the variation in the displacement volume of the cylinder 1 resulting from the entry of the piston rod 8. A seal member interposed between the cylinder 1 and the piston rod 8 maintains the oil-tight characteristics of the cylinder 1.

When a force in an axial direction acts on the piston rod 8 or on the cylinder 1 or on both those components, the piston rod 8 displaces relative to the cylinder 1. This relative displacement results in the main piston 2 displacing in the cylinder 1 in a vertical direction as shown in the figure.

A damping force generation element 10 comprising an orifice or a leaf valve is provided along the first passage 3 in order to apply a resistance to the flow of working oil.

When the shock absorber performs an expansion stroke, in order words, when the piston rod 8 protrudes from the cylinder 1, the main piston 2 compresses the upper operating chamber R1 and expands the lower operating chamber R2. Consequently the pressure in the upper operating chamber R1 increases and the pressure in the lower operating chamber R2 decreases.

The pressure increase in the upper operating chamber R1 displaces working oil to the upper pressure chamber R3A through the second passage 4a. As a result, the free piston 5 is depressed against the resilient force of the spring S. The depression of the free piston 5 moves working oil from the lower pressure chamber R3B which is in a compressed state through the third passage 4b to the lower operating chamber R2 which has a lower relative pressure. When the shock absorber undergoes a further expansion, working oil flows from the upper operating chamber R1 through the first passage 3 to the lower operating chamber R2.

When the shock absorber undergoes compression, in other words, when the piston rod 8 enters the cylinder 1, the main piston 2 compresses the lower operating chamber R2 and expands the upper operating chamber R1. Thus the pressure in the upper operating chamber R1 decreases and the pressure in the lower operating chamber R2 increases.

Working oil flows from the lower operating chamber R2 which has an increased pressure through the third passage 4b to the lower pressure chamber R3B and presses the free piston 5 upwardly together with the spring S. The upward movement of the free piston 5 moves working oil from the upper pressure chamber R3A having a compressed volume through the second passage 4a to the upper operating chamber R1 having a decreased pressure. When the shock absorber undergoes a further compression, working oil moves from the lower operating chamber R2 to the upper operating chamber R1 through the first passage 3.

The volume occupied by the piston rod 8 in the cylinder 1 varies as a result of the compression and expansion of the shock absorber as described above. The fluctuation in the volume of the working oil in the cylinder 1 resulting from variation in the volume occupied by the piston rod 8 is supplemented by expansion and compression of the gas chamber G by the free piston 7.

Next the characteristics of the damping force of a shock absorber will be described referring to FIG. 2.

Hereafter the flow of working oil when the main piston 2 displaces upwardly is considered, in other words when the shock absorber undergoes an expansion stroke.

A differential pressure between the upper operating chamber R1 and the lower operating chamber R2 is defined as P.

When the flow amount of working oil from the upper operating chamber R1 is taken to be Q, the flow amount of working oil through the first passage 3 is Q1 and the flow amount of working oil flowing through the second passage 4a is Q2, the following equation (1) is obtained.

$$Q = Q1 + Q2 \tag{1}$$

The relationship expressed by the following equation (2) is due to the differential pressure P and the flow amount Q1 of the first passage 3.

$$P = C1 \cdot Q1 \tag{2}$$

where, C1=flow coefficient.

When the pressure in the upper pressure chamber R3A is taken to be P1, the following equation (3) is obtained.

$$P = P1 + C2 \cdot Q2 \tag{3}$$

where, C2=flow coefficient.

When the pressure in the lower pressure chamber R3B is P2, the pressure receiving area of the free piston 5 is A, the displacement amount of the free piston 5 is X and the spring coefficient of the spring S is K, the following equation (4) is obtained.

$$P1 \cdot A = P2 \cdot A + K \cdot X \tag{4}$$

The flow amount of working oil flowing out of the lower pressure chamber R3B through the third passage 4b to the lower operating chamber R2 is equal to the flow amount Q2 of the second passage 4a. Thus an equation (5) related to the pressure P2 in the lower pressure chamber R3B is obtained.

$$P2 = C3 \cdot Q2 \quad (5)$$

where, C3=flow coefficient.

The displacement amount of the working oil is given by Equation (6).

$$A \cdot X = \int Q2 \cdot dt \quad (6)$$

When a Laplace transformation is applied to Equations (1)-(6) in order to calculate a transfer function of the differential pressure P relative to the flow amount Q, Equation (7) is obtained.

$$G(s) = \frac{P(s)}{Q(s)} = \frac{C1 \cdot \left\{1 + A^2 \cdot (C2 + C3) \cdot \frac{s}{K}\right\}}{1 + A^2 \cdot (C1 + C2 + C3) \cdot \frac{s}{K}} \quad (7)$$

where, s=Laplace operator.

Equation (8) is obtained by assigning j·ω as the Laplace operator s in the transfer function of Equation (7) in order to calculate the absolute value of the frequency transfer function G(j·ω).

$$|G(j \cdot \omega)| = \frac{C1}{K^2 + A^4 \cdot (C1 + C2 + C3)^2 \cdot \omega^2} \cdot \quad (8)$$
$$[K^4 + K^2 \cdot A^4 \cdot \{2 \cdot (C2 + C3) \cdot (C1 + C2 + C3) + C1^2\} \cdot \omega^2 +$$
$$A^8 \cdot (C2 + C3)^2 \cdot (C1 + C2 + C3)^2 \cdot \omega^4]^{\frac{1}{2}}$$

The phase Φ of the frequency transfer function is given by Equation (9).

$$\Phi = \mathrm{Tan}^{-1}\left\{\frac{-C1 \cdot K \cdot A^2 \cdot \omega}{K^2 + A^4 \cdot (C2 + C3) \cdot (C1 + C2 + C3) \cdot \omega^2}\right\} \quad (9)$$

The frequency F is given by dividing the angular frequency ω by 2π in Equation (9).

Figure 3:
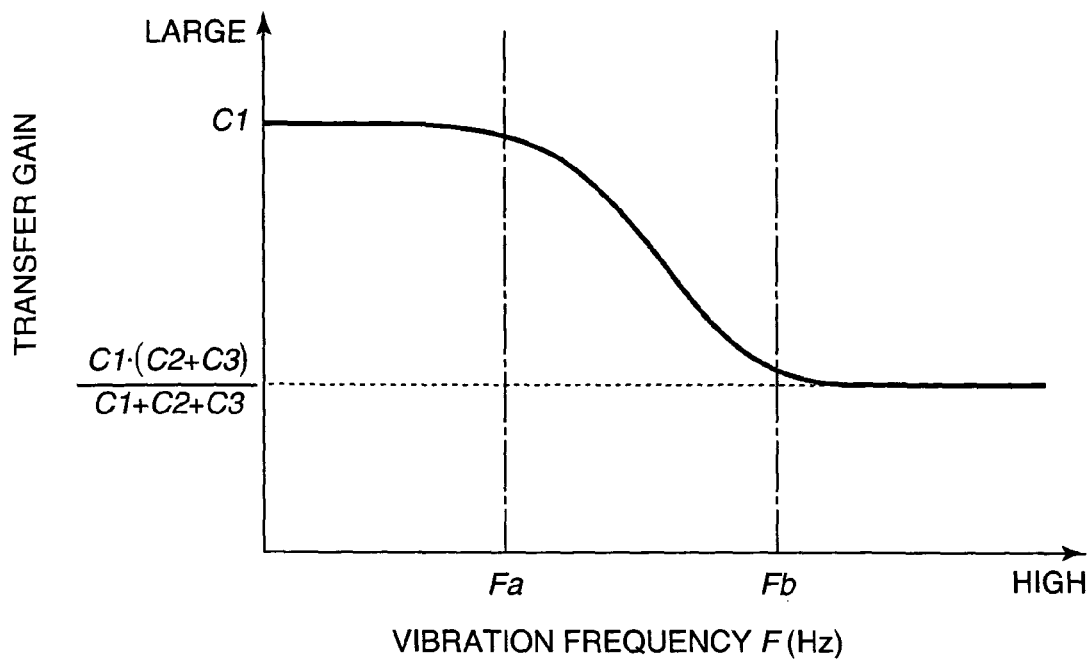
FIG. 3 is a diagram showing the relationship between vibration frequency F and transmission gain in the shock absorber.

Referring now to FIG. 3, the gain characteristics of the frequency transfer function G(j·ω) with respect to the vibration frequency F displays two flection frequencies $$Fa = \frac{K}{2 \cdot \pi \cdot A^2 \cdot (C1 + C2 + C3)}$$

and $$Fb = \frac{K}{2 \cdot \pi \cdot A^2 \cdot (C2 + C3)}.$$

In the figure, the transmission gain is substantially equal to C1 in the region F<Fa. In the region Fa≦F≦Fb, the transmission gain is gradually decreases from C1 to $$\frac{C1 \cdot (C2 + C3)}{C1 + C2 + C3}.$$

In the region F>Fb, the transmission gain is $$\frac{C1 \cdot (C2 + C3)}{C1 + C2 + C3}.$$

Figure 4:
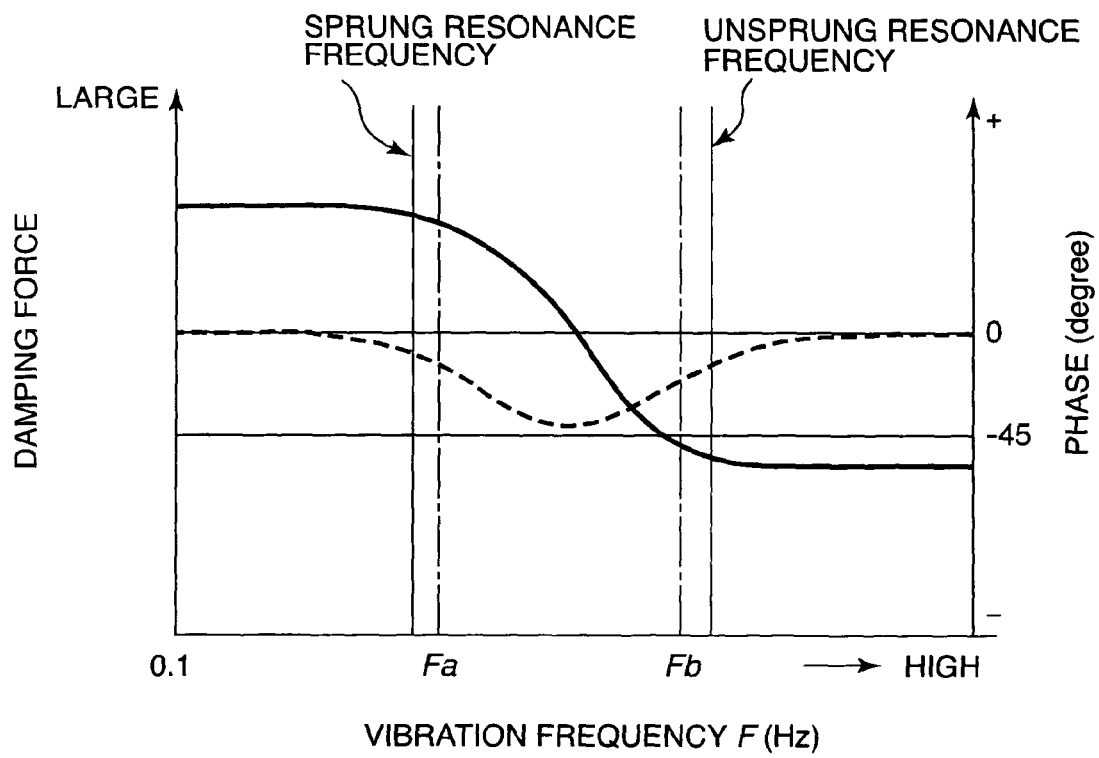
FIG. 4 is a diagram showing the relationship between vibration frequency F, displacement phase Φ, and a frequency transfer function G(j·ω) of the damping characteristics in the shock absorber.

The gain characteristics of the frequency transfer function G(j·ω) obtained in the above manner are converted to a damping coefficient ζ by multiplying the square of the pressure receiving area B of the main piston 2 by |G(j·ω)|. In this manner, the relationship between the frequency F, the phase Φ, and the damping characteristics of the frequency transfer function G(j·ω) can be obtained as shown in FIG. 4.

In other words, this shock absorber produces a large damping force when the frequency F is lower than the flection frequency Fa and produces a small damping force when the frequency F is higher than the flection frequency Fb. In the region in which the frequency F is higher than the flection frequency Fa and lower than the flection frequency Fb, the damping force gradually decreases as the frequency F increases.

Thus the flection frequencies Fa and Fb can be determined using the flow coefficient C1, the flow coefficient C2, the flow coefficient C3, the pressure receiving area A of the free piston 5 and the spring constant K of the spring S. The flow coefficient C1 is calculated using Equation (2) and shows the relationship between the differential pressure P and the flow amount of working oil Q1 through the first passage 3. The flow coefficient C2 is calculated using Equation (3) and shows the relationship between the pressure P1 in the upper pressure chamber R3A and the flow amount of working oil Q2 through the second passage 4a. The flow coefficient C3 is calculated using Equation (5) and shows the relationship between the pressure P2 in the lower pressure chamber R3B and the flow amount of working oil Q2 through the third passage 4b.

The damping coefficient ζ is calculated using the flow coefficients C1, C2, C3 and the pressure receiving area B of the piston 2.

If required, the damping characteristics of the shock absorber can be determined using the flow coefficients C1, C2, C3, the pressure receiving area A of the free piston 5 and the spring constant K of the spring S.

The flow coefficient C1 is a value determined from the resistance applied by the damping force generating element 10 in the first passage 3 to the flow of working oil. The flow coefficient C2 is a value determined from the resistance of the orifice 11 provided in the second passage 4a to the flow of working oil. The flow coefficient C3 is a value determined from the resistance of the orifice 12 in the third passage 4b to the flow of working oil.

The flection frequencies Fa and Fb and the variation amount in the damping coefficient ζ relative to input vibration frequencies F shown in FIG. 4 can be simply adjusted on the basis of the settings given to the flow coefficients C1, C2, C3, the pressure receiving area A of the free piston 5, and the spring constant K of the spring S.

In other words, this shock absorber can vary the damping force characteristics with respect to input vibration frequencies in contrast to a conventional shock absorber which varies the damping force characteristics in response to the dimension of the vibration amplitude. This shock absorber also facilitates the regulation of the damping force. As a result, it is possible to produce a small damping force with respect to high-frequency input vibrations resulting from a vehicle passing over undulated portions of a road surface. Furthermore it is possible to produce a large damping force with respect to low-frequency input vibrations resulting from variations in the load on the shock absorber when a vehicle makes a turn.

Since this shock absorber facilitates the regulation of the damping characteristics, when the shock absorber is applied to vehicles of various specifications, it is not necessary to perform complicated adjustments in order to produce damping force characteristics matching the vehicle. Furthermore design and tuning are also facilitated.

When the flection frequency Fb of the two flection frequencies Fa and Fb is set to a value less than the unsprung resonance frequency of the vehicle, the shock absorber always produces a small damping force as shown by FIG. 4 when a vibration at the unsprung resonance frequency is input to the vehicle. Consequently these characteristics maintain preferred vehicle performance characteristics.

In the region in which the input vibration frequency F exceeds the flection frequency Fb, the phase delay of the damping coefficient $\zeta$ displays a tendency to decrease and a damping force is produced without delay with respect to an input vibration. Consequently these characteristics maintain preferred vehicle performance characteristics.

The production of a large damping force by the shock absorber with respect to input vibrations greater than the sprung resonance frequency is ensured by setting the smaller flection frequency Fa to a value which is less than the unsprung resonance frequency and greater than the sprung resonance frequency of the vehicle. These characteristics stabilize the orientation of the vehicle and maintain stability so that passengers do not feel insecure when the vehicle is turning. In the frequency region less than the flection frequency Fa, the phase delay of the damping coefficient $\zeta$ tends to decrease and a damping force is produced without delay with respect to input vibrations. Thus these characteristics also produce preferred performance characteristics in which passengers feel secure.

The setting of the flow coefficients C2 and C3 allows either one of the orifices 11 and 12 to be omitted. It is also possible to set the cross sectional area of the passage 4a and 4b to satisfy the flow coefficient C2 and C3 without implementing the orifices 11 and 12.

Next the detailed structure of the shock absorber will be described with reference to FIGS. 5 and 6.

Figure 5:
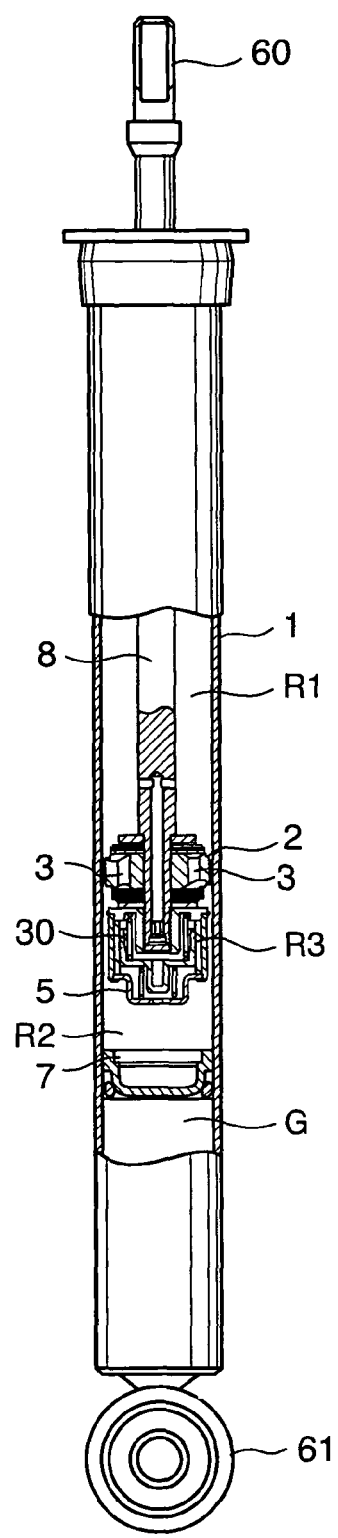
FIG. 5 is a lateral view including a partial sectional view of the shock absorber.

FIG. 5 shows the overall structure of the shock absorber. As shown in the figure, the pressure chamber R3 housing the free piston 5 is provided in a housing 30 which is integrated with the main piston 2 below the main piston 2. A bracket 60 on the upper end of the piston rod 8 in the shock absorber is connected to the vehicle body and a bracket 61 on the lower end of the cylinder 1 is connected to the vehicle wheel axle.

Figure 6:
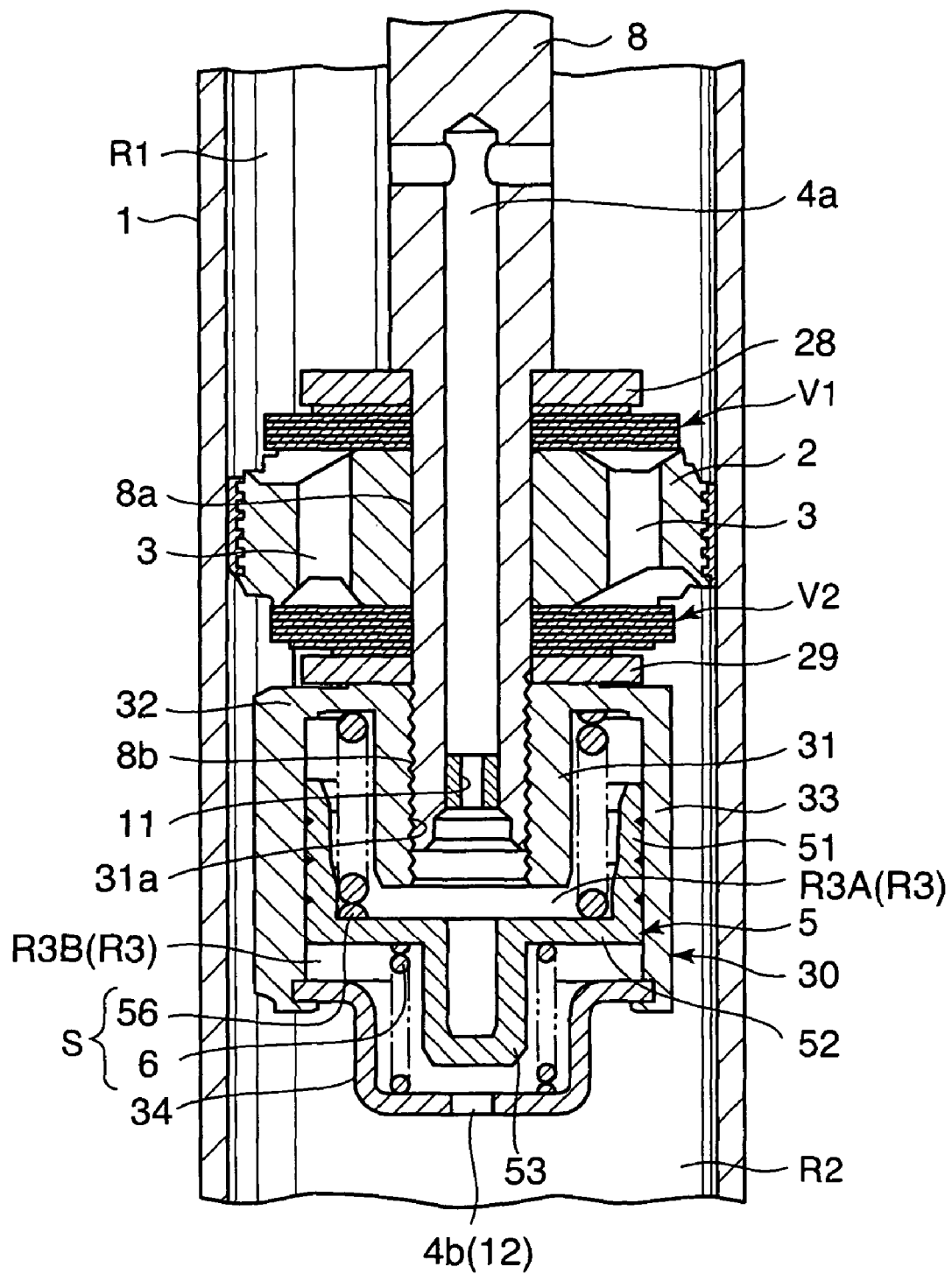
FIG. 6 is an enlarged transverse view of the main components of the shock absorber.

Referring to FIG. 6, a small radius piece 8a is provided on the lower end of the piston rod 8. A male threaded section 8b is formed on the tip of the small radius piece 8a. The second passage 4a is formed through the small radius piece 8a on the inner side of the piston rod 8. One end of the second passage 4a is connected to the upper operating chamber R1 and the other end opens downwardly from the lower end of the piston rod 8. An orifice 11 is formed along the second passage 4a and has an inner radius which is smaller than the second passage 4a. Instead of providing the orifice 11 in the position shown in the figure, the orifice 11 may be formed by closing the cross sectional area of the opening on the tip of the small radius piece 8a or the connecting section between the second passage 4a and the upper operating chamber R1.

The piston 2 comprises an annular member having a hollow center. The small radius piece 8a of the piston rod 8 passes through the hollow center. A pair of first passages 3 pass through the piston 2 and connect the upper operating chamber R1 and the lower operating chamber R2. The opening facing the upper operating chamber R1 on the upper end of one of the first passages 3 is closed by a laminated leaf valve V1 acting as the damping force generating element 10. The opening facing the lower operating chamber R2 on the lower end of the other of the first passages 3 is closed by a laminated leaf valve V2 also acting as the damping force generating element 10.

The laminated leaf valves V1 and V2 are respectively formed in an annular shape and the inner periphery thereof is engaged with the outer periphery of the small radius piece 8a of the piston rod 8. The laminated leaf valves V1 and V2 are laminated on the piston 21. The amount of bending of the laminated leaf valves V1 and V2 is respectively limited by the annular valve stoppers 28 and 29 which are fitted on the outer periphery of the small radius piece 8a.

The small radius piece 8a passes in sequence through the stopper 28, the laminated leaf valve V1, the main piston 2, the laminated leaf valve V2 and the stopper 29. A female threaded section 31a formed on the housing 30 is screwed on the male threaded section 8b formed on the tip. Thus the stopper 28, the laminated leaf valve V1, the main piston 3, the laminated leaf valve V2 and the stopper 29 are fixed to the piston rod 8.

The laminated leaf valve V1 is opened by bending in response to a differential pressure between the lower operating chamber R2 and the upper operating chamber R1 during a compression stroke of the shock absorber and allows working oil to flow from the lower operating chamber R2 to the upper operating chamber R1 through the first passage 3 with a fixed resistance. When the shock absorber undergoes an expansion stroke, this first passage 3 facing the laminated leaf valve V1 is closed.

The laminated leaf valve V2 is opened by bending in response to a differential pressure between the lower operating chamber R2 and the upper operating chamber R1 during an expansion stroke of the shock absorber and allows working oil to flow to the lower operating chamber R2 from the upper operating chamber R1 through the first passage 3 with a fixed resistance. When the shock absorber undergoes a compression stroke, this first passage 3 facing the laminated leaf valve V2 is closed. In other words, the laminated leaf valve V1 produces a damping force with respect to a compression stroke in the shock absorber and the laminated leaf valve V2 produces a damping force with respect to an expansion stroke in the shock absorber.

The produced damping force of the laminated leaf valves V1 and V2 is set to be larger than the damping force produced by the passages 4a and 4b.

The housing 30 comprises a cylindrical outer tube 33, a flange 32 abutting from below onto the stopper 29, an inner tube 31 forming the female threaded section 31a screwed on the male threaded section 8b of the piston rod 8 and a cap 34 closing the lower end of the outer tube 33. The inner tube 31 protrudes from the inner periphery of the flange 32 downwardly in an axial direction to the inner side of the outer tube 33. The inner tube 31 and the flange 32 and the outer tube 33 are formed in a one-piece construction. The cap 34 is fixed by caulking to the lower end of the outer tube 33.

The free piston 5 is housed on the inner side of the housing 30, and the pressure chamber R3 in the housing 30 is divided into an upper pressure chamber R3A and a lower pressure chamber R3B by the free piston 5.

The upper pressure chamber R3A is connected with the upper operating chamber R1 through the second passage 4a opened on the lower end of the small radius piece 8a of the piston rod 8.

The sectional shape of the outer periphery of the outer tube 33 is circular with an indented portion. This shape is adapted to fix the inner tube 31 into the small radius piece 8a of the piston rod 8 using a tool engaged to the outer periphery. However the sectional shape of the outer periphery of the outer tube 33 enabling the above operation may also be a shape which is not perfectly circular or may be, for example, hexagonal. The sectional shape of the outer periphery of the outer tube 33 is chosen to facilitate the fixing operation onto the piston rod 8 of the housing 30.

The cap 34 is a member comprising a closed-end cylinder provided with a flange. The outer periphery of the flange is fixed by caulking to the lower end of the outer tube 33. The third passage 4b connecting the lower operating chamber R2 and the lower pressure chamber R3B is formed on the bottom of the cap 34. The third passage 4b itself functions as an orifice 12 by making the cross sectional area of the third passage 4b a small value.

The free piston 5 comprises a cylindrical section 51 sliding on the inner periphery of the outer tube 33 and a bottom section 52 closing the lower end of the cylindrical section 51. The bottom section 52 comprises a protruding section 53 at the center facing downward.

A coil spring 6 is provided on the inner side of the lower pressure chamber R3B. The coil spring 6 is interposed between the cap 34 and the bottom section 52 of the free piston 5. The coil spring 6 is disposed along the outer periphery of the protruding section 53 and its displacement in a radial direction is limited by the protruding section 53 and the cap 34.

A coil spring 56 is provided on the inner side of the upper pressure chamber R3A. The coil spring 56 biases the free piston 5 in the opposite direction to the spring 6 and is interposed between the flange 32 and the bottom section 52 of the free piston 5. The coil spring 56 is disposed along the inner periphery of the cylindrical section 51 and its displacement in a radial direction z is limited by the cylindrical section 51.

The free piston 5 is resiliently supported in a vertical direction by the coil springs 6 and 56. When the pressure in the lower pressure chamber R3B is equal to the pressure in the upper pressure chamber R3A, the free piston 5 is maintained stably in a fixed neutral position. The coil springs 6 and 56 corresponds to the spring S in FIGS. 1 and 2.

These springs 6 and 56 prevent relative displacement of the center axis of the free piston 5 and that of the outer tube 33 and the relative inclination therebetween, thereby suppressing unintended increase in the sliding resistance of the free piston 5.

The inner radius of the cylindrical section 51 of the free piston 5 increases in an upward direction. This radial increase maintains a space for the increase in the radius of the windings when the coil spring 6 compresses. When the radius of windings of the coil spring 6 expands during compression, the coil spring 6 abuts with the inner periphery of the cylindrical section 51. At this time, when the free piston 5 displaces in an axial direction, there is the possibility that working oil will be contaminated as a result of wear between the piston 5 and the spring 6. The expansion of the inner radius of the cylindrical section 51 in an upward direction is useful in order to prevent this type of working oil contamination.

The free piston 5 slides the cylindrical section 51 on the inner periphery of the outer tube 33. Thus it is possible to maintain a sufficient axial length for the sliding section. This supporting structure of the free piston 5 is preferable in prevention of relative displacement of the center axis of the free piston 5 and that of the outer tube 33 as well as in prevention of the relative inclination therebetween, Referring again to FIG. 5, a free piston 7 which divides the lower operating chamber R2 and the gas chamber G is provided with an indented section opening in an upward direction. During maximum compression of the shock absorber, the cap 34 of the housing 30 is received into the indented section. Generally the provision of a housing 30 on the tip of the piston rod 8 of a single-tube shock absorber is disadvantageous from the point of view of maintaining the stroke distance. However the formation of the above type of indented section on the free piston 7 allows for some lengthening of the stroke distance.

The damping characteristics of the shock absorber constituted as above are determined by the pressure receiving area A of the free piston 5, the various flow coefficients C1, C2, C3 as described above and the spring coefficient K of the spring S. The spring coefficient K of the spring represents the total spring coefficient of the coil springs 6 and 56.

The flow coefficient C1 depends on the flow resistance of the laminated leaf valves V1 and V2. The flow coefficient C2 depends on the flow resistance of the orifice 1. The flow coefficient C3 depends on the flow resistance of the third passage 4b which functions as an orifice 12.

Thus the flow resistance of the above members, the pressure receiving area A of the free piston 5 and the setting of the spring coefficient K of the spring S allows the flection frequencies Fa and Fb to be set in an arbitrary manner. The amount of variation in the damping coefficient ζ relative to the input vibration frequency F can also be set in an arbitrary manner. Thus this shock absorber facilitates arbitrary setting of damping characteristics in response to the input vibration frequency.

Depending on the flow coefficient C3, the sectional area of the third passage 4b can be increased as long as the free piston 5 and the coil spring 6 do not detach from the housing 30. In this manner, the resistance to the flow of working oil can be minimized. Furthermore if the second passage 4a can satisfy the setting of the flow coefficient C2 without the provision of the orifice 11, the orifice 11 can be omitted.

In this shock absorber, it is possible to have several damping characteristics that can be selectively applied by a manual operation by a driver of the vehicle or according to a command signal output from a controller.

For example, a valve seat is provided on the opening of the second passage 4a formed at the tip of the small radius piece 8a of the piston rod 8. A poppet valve acting with respect to the valve seat can operate from the outer side of the shock absorber through a control rod provided through the piston rod 8. Since the flow resistance of the working oil in the second passage 4a is varied as a result of variation in the surface area of the opening of the poppet valve as controlled by the control rod, it is possible to vary the flow coefficient C2 in an arbitrary manner. Instead of the poppet valve, a spool valve or a rotary valve may be used.

Figure 7:
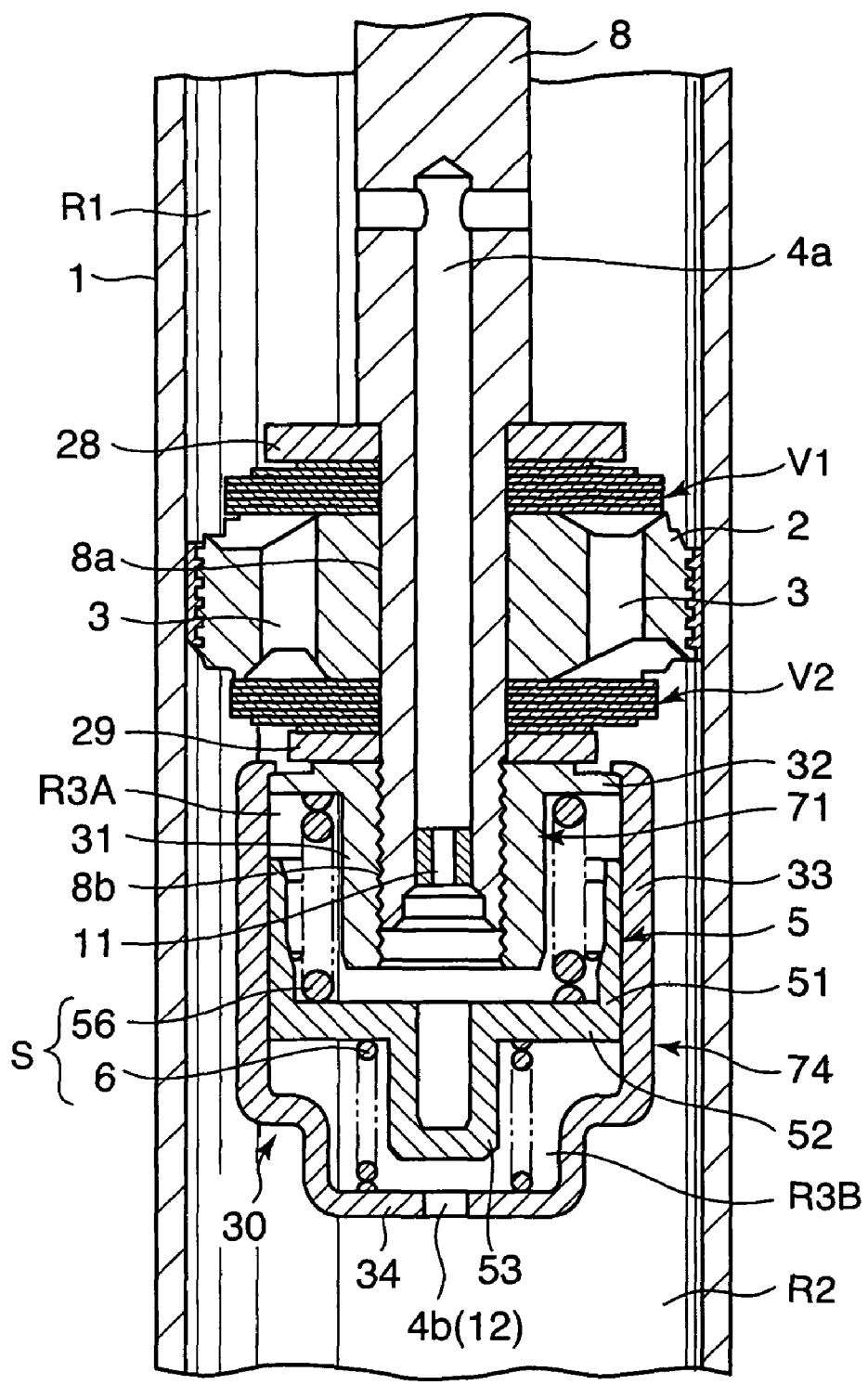
FIG. 7 is similar to FIG. 6 but shows a variation on the housing.

Next referring to FIG. 7, a variation of the housing 30 will be described.

The variation is such that the outer tube 33 of the housing 30 is separated from the flange 32. The inner tube 31 and the flange 32 comprise an integrated first member 71 and the outer tube 33 and the cap 34 comprise an integrated second member 74.

The flange 31 of the integrated first member 71 is fixed by caulking to the upper end of the outer tube 33 of the second member 74.

When the shock absorber is assembled, the inner tube 31 of the first member 71 is screwed on the male threaded section 8b on the tip of the piston rod 8.

The coil spring 6 and 56 and the free piston 5 are disposed in the second member 74. In this state, the flange 32 of the first member 71 is fixed by caulking to the upper end of the outer tube 33 of the second member 74.

When the housing 30 is constructed in the above manner, the inner tube 31 is screwed on the male threaded section 8b on the tip of the piston rod 8 without exerting a torque to the second member 74. Thus it is possible to prevent deformation of the second member 74 resulting from mounting the housing 30 on the piston rod 8 and to facilitate the assembly of the housing 30.

Even when the deformation of the second member 74 is extremely small, there is an undesirable effect on the sliding of the free piston 5 on inner sections. Thus when the housing 30 is constructed in the above manner, smooth sliding of the free piston 5 can be ensured and the designed damping characteristics can be obtained.

Figure 8:
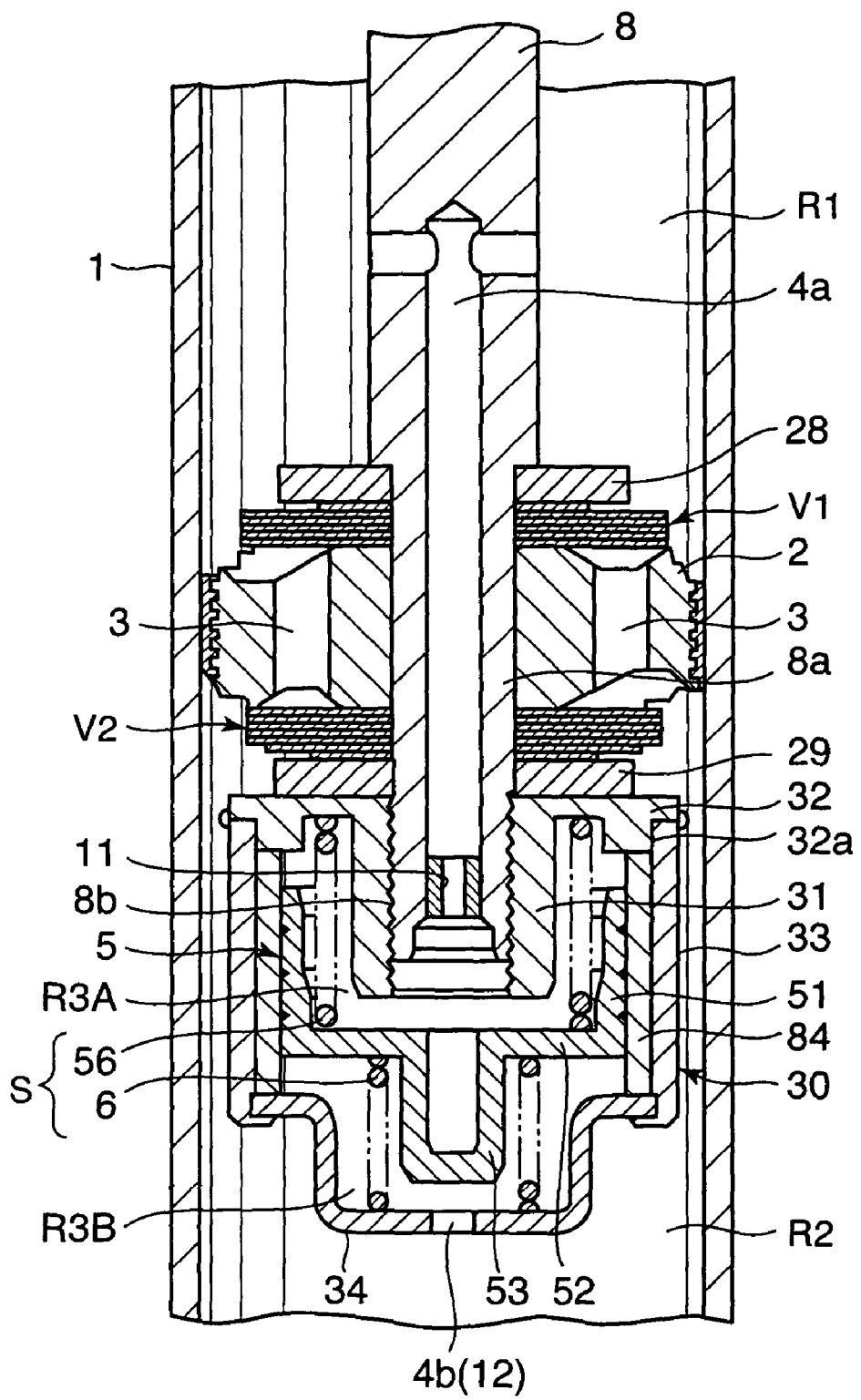
FIG. 8 is similar to FIG. 6 but shows another variation on the housing.

Referring to FIG. 8, a further variation on the housing 30 will be described.

In this variation, the outer tube 33 and the flange 32 of the housing 30 are separated. The outer tube 33 and the cap 34 are also separated and are mutually fixed by caulking as in the shock absorber shown in FIG. 6.

A sleeve 84 is inserted into the outer tube 33. The free piston 5 slides on the inner periphery of the sleeve 84.

A step 32a is formed along the outer periphery on the lower face of the flange 32. The outer tube 33 is engaged with the outer periphery of the step 32a and is fixed by welding to the step 32a. When completed, axial displacement of the sleeve 84 is respectively prevented by the step 32a and the cap 34 and radial displacement is prevented by the outer tube 33.

When assembling the shock absorber, the housing 30 is assembled in advance with the sleeve 84, the coil spring 6 and 56 and the free piston 5 housed therein, When the housing assembly is completed, the inner tube 31 is screwed on the male threaded section 8b on the tip of the piston rod 8. Although the threading operation applies a torque to the outer tube 33, even when the outer tube 33 deforms slightly as a result of the torque, no effect results on the sleeve 84. Thus smooth axial displacement of the free piston 5 when sliding on the inner periphery of the sleeve 84 can be ensured. When the outer tube 33 and the step 32a are welded together, in a similar manner to the above, there is no adverse effect on the sleeve 84 as a result of deformation of the flange 32 or the outer tube 33 which may occur due to the welding operation. Thus the free piston 5 can maintain smooth axial sliding.

Figure 9:
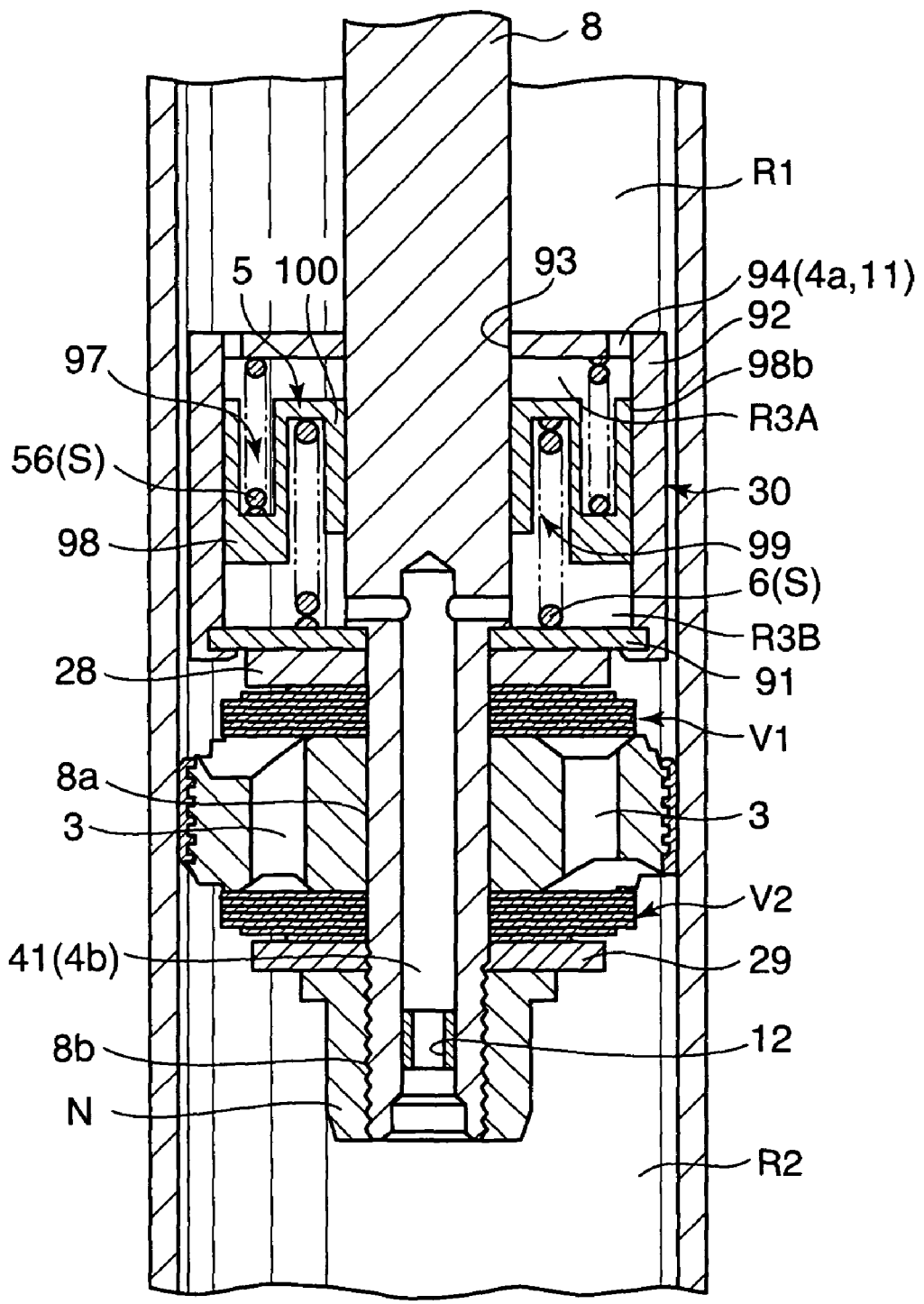
FIG. 9 is an enlarged transverse view of the main components of a shock absorber according to a second embodiment of this invention.

Referring to FIG. 9, a second embodiment of this invention will be described.

This embodiment differs from the first embodiment in that the housing 30 of the pressure chamber R3 is provided above the main piston 2, in other words on the side of the upper operating chamber R1.

The housing 30 is attached to the small radius piece 8a of the piston rod 8 at a location above the piston 2, prior to fitting the piston 2, the laminated leaf valve V1, V2 and the stopper 28, 29. After the housing 30 is attached, the stopper 28, the laminated leaf valve V1, the piston 2, the laminated leaf valve V2 and the stopper 29 are attached in sequence to the small radius piece 8a. A nut N is tightened to the male threaded section 8b on the tip of the small radius piece 8a. In this manner, the housing 30 is fixed to a predetermined position on the piston rod 8.

The free piston 5 is housed in the pressure chamber R3 in the housing 30. The pressure chamber R3 is partitioned into an upper pressure chamber R3A and a lower pressure chamber R3B by the free piston 5 in the same manner as the first embodiment.

In this embodiment, the second passage 4a and the orifice 11 connecting the upper operating chamber R1 and the upper pressure chamber R3A comprise a plurality of through holes 94 provided in the upper end face of the housing 30. The third passage 4b connecting the lower operating chamber R2 and the lower pressure chamber R3B comprises a passage 41 provided through the small radius piece 8a. The orifice 12 is provided in the passage 41.

The housing 30 comprises a cylindrical member 92 opened in a downward direction and an annular plate member 91 fixed by caulking to the opening of the cylindrical member 92. The upper end of the cylindrical member 92 is closed. The axial displacement of the housing 30 is limited by a stopper 28 and a step on the upper end of the small radius piece 8a of the piston rod 8 retaining the plate member 91 vertically.

A through hole 93 fitting the piston rod 8 is formed on the upper end face of the cylindrical member 92. The through holes 94 are formed at positions which do not overlap with the hole 93. In the figure, two holes 94 are shown. However the number of holes 94 can be arbitrarily increased or decreased in response to the setting of the flow coefficient C2 and C3 as described above.

The free piston 5 comprises an outer peripheral section 98 sliding on the inner periphery of the cylindrical member 92 and an inner peripheral section 100 sliding on the outer periphery of the piston rod 8.

The free piston 5 slides on both the outer periphery of the piston rod 8 and the inner periphery of the cylindrical member 92. Thus it is possible to prevent relative displacement of the center axis of the free piston 5 and that of the cylindrical member 92 and that of the piston rod 8, and the relative inclination among these center axes, thereby suppressing unintended increase in the sliding resistance of the free piston 5.

Two annular grooves 97 and 99 oriented in opposite axial directions are formed between the inner peripheral section 100 and the outer peripheral section 98 of the free piston 5. A coil spring 56 with one end abutting with the upper end face of the cylindrical member 92 is housed in the upward-facing annular groove 97. A coil spring 6 with one end abutting with the plate member 91 is housed in the downward-facing annular groove 99. The upward-facing annular groove 97 limits the radial displacement of the coil spring 56. The downward-facing annular groove 99 limits the radial displacement of the coil spring 6. In this embodiment, the coil spring 6 and 56 also corresponds to the spring S in FIGS. 1 and 2.

In this embodiment as in the first embodiment, the damping characteristics of the shock absorber are determined by the pressure receiving area A of the free piston 5, the flow coefficients C1, C2, C3 and the spring coefficient K of the spring S. The spring coefficient K of the spring represents the total spring coefficient of the coil springs 6 and 56.

The flow coefficient C1 depends on the flow resistance of the laminated leaf valve V1 and V2. The flow coefficient C2 depends on the number of through holes 94 and the flow resistance of each through hole 94. The flow coefficient C3 depends on the flow resistance of the orifice 12.

Thus the flow resistance of the above members, the pressure receiving area A and the setting of the spring coefficient K of the spring S allow the flection frequencies Fa and Fb to be set in an arbitrary manner. The amount of variation in the damping coefficient $\zeta$ relative to the input vibration frequency F can also be set in an arbitrary manner. Therefore in this embodiment, the damping characteristics can also be set simply and in an arbitrary manner in response to the input vibration frequency as in the first embodiment.

In this embodiment, the through holes 94 connect the upper operating chamber R1 and the upper pressure chamber R3A. The passage 41 formed in the piston rod 8 connects the lower operating chamber R2 and the lower pressure chamber R3B. However it is also possible to provide through holes connecting the upper operating chamber R1 and the lower pressure chamber R3B with the plate member 91. It is also possible to provide a passage connecting the lower operating chamber R2 and the upper pressure chamber R3A with the inner side of the piston rod 8.

A through hole 93 is formed with a radius which allows engagement with the outer periphery of the small radius piece 8a. The inner radius of the plate member 91 is adapted to allow engagement with the outer periphery of the piston rod 8 located above the small radius piece 8a. This arrangement allows the housing 30 to be fitted into the piston rod 8 which is oriented in an opposite vertical direction.

According to this embodiment, when the housing 30 is fitted to the piston rod 8, a torque is not applied to the housing 30. Thus the housing is not deformed by the torque and it is possible to maintain smooth axial displacement of the free piston 5.

Figure 10:
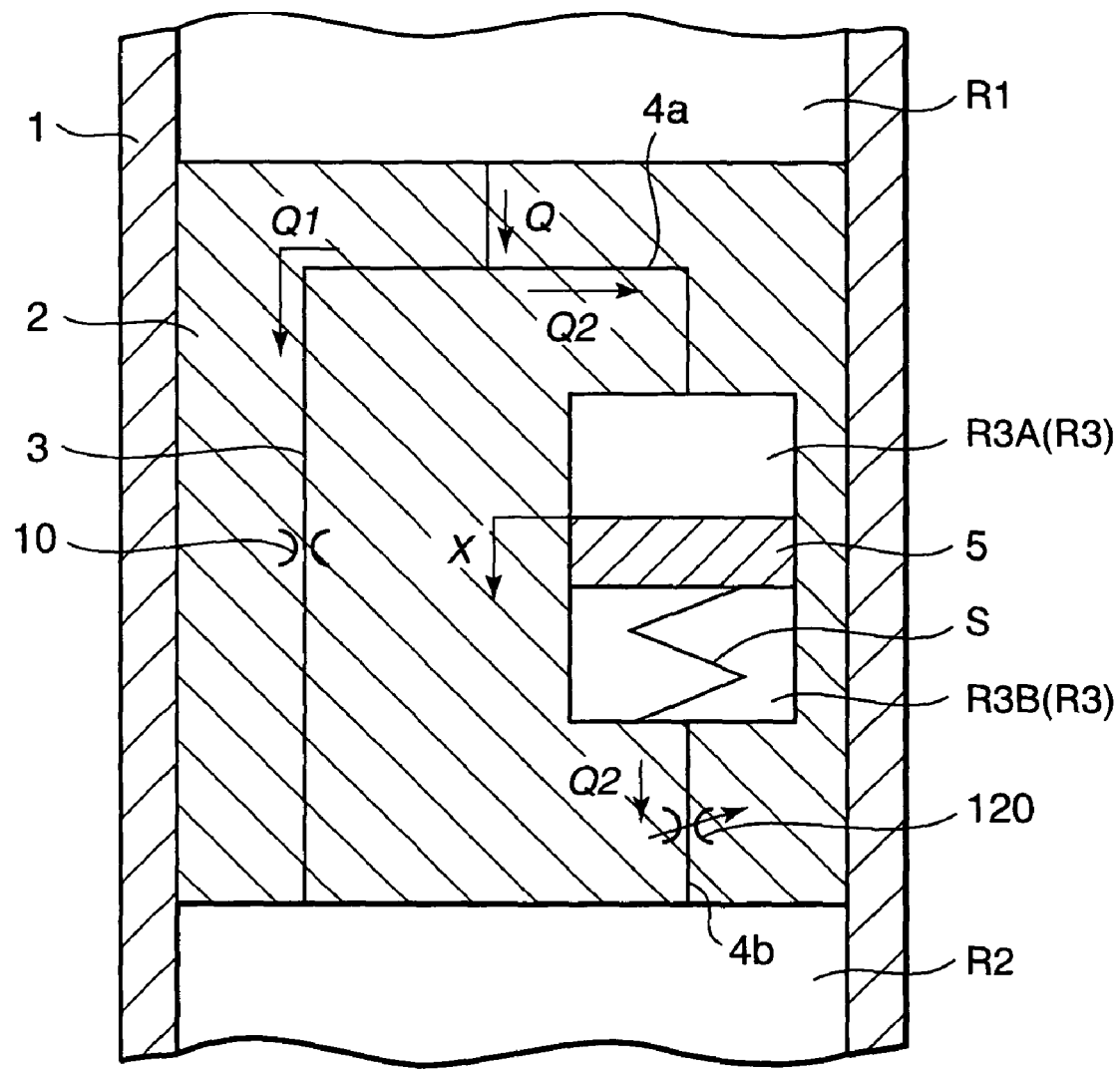
FIG. 10 is a diagram showing the flow of working oil during an expansion stroke of a shock absorber according to a third embodiment of this invention.
Figure 11:
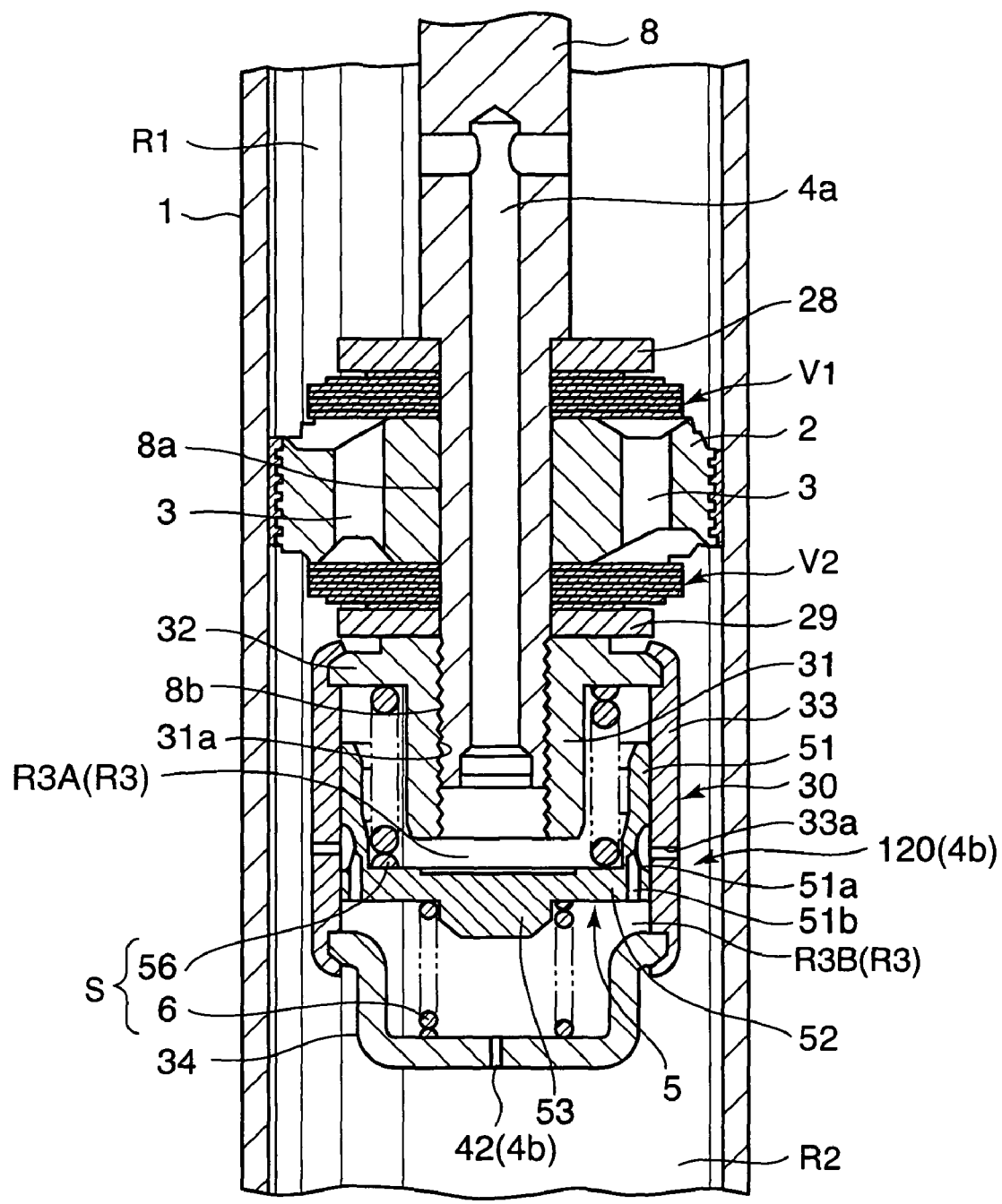
FIG. 11 is an enlarged transverse view of the main components of the shock absorber according to the third embodiment of this invention.

Referring to FIG. 10 and FIG. 11, a third embodiment of this invention will be described. Those components which correspond to the first embodiment will be designated by the same reference numerals and additional description will be omitted.

Figure 2:
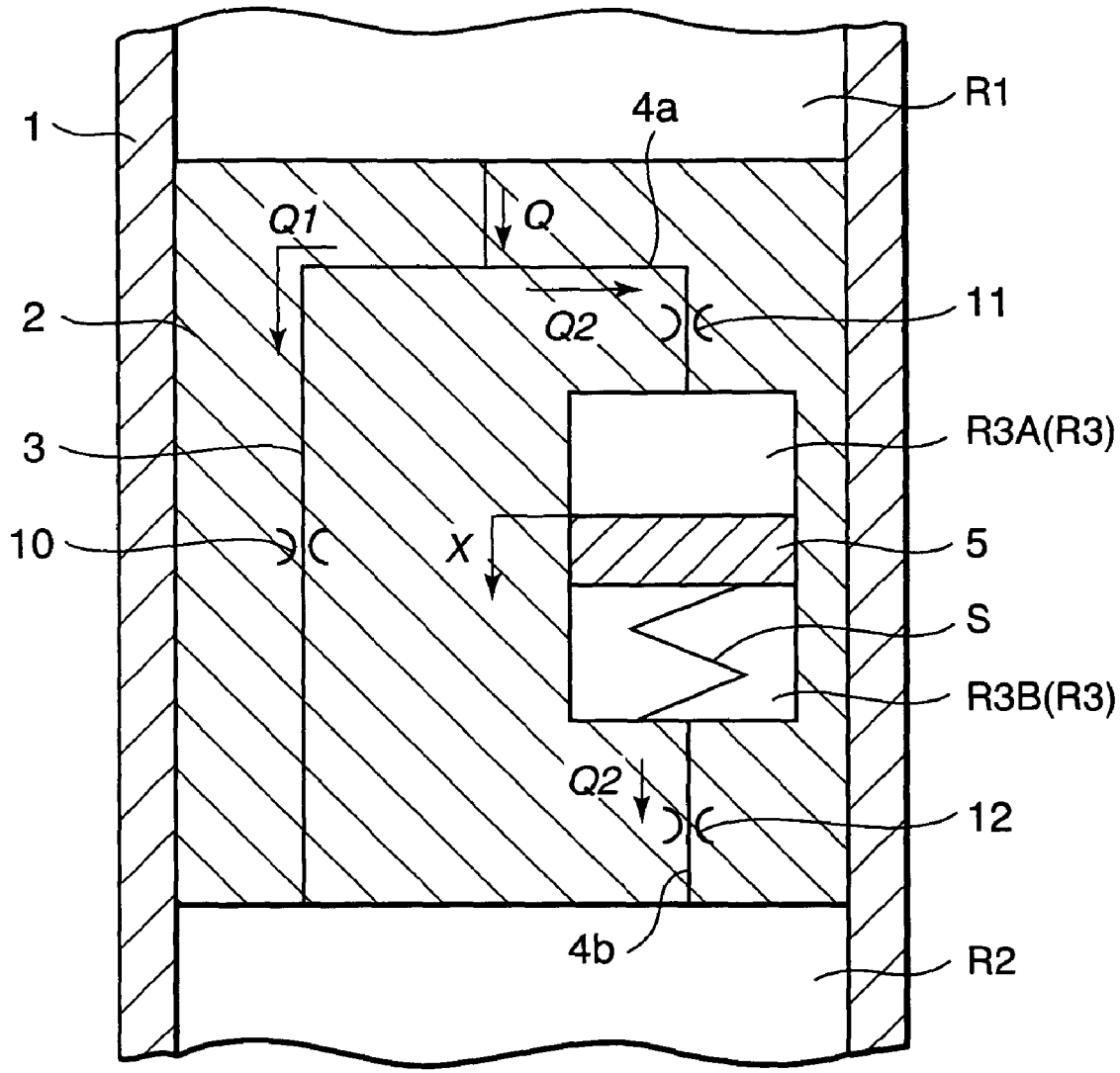
FIG. 2 is a diagram showing the flow of working oil during an expansion stroke of the shock absorber.

Referring to FIG. 10, in this embodiment, the orifice 11 of the first embodiment as shown in FIG. 2 is omitted from the second passage 4a for working oil. In the place of the orifice 12, a variable orifice 120 is provided in the third passage 4b.

Referring to FIG. 11, the housing 30 of this embodiment comprises an outer tube 33, a flange 32 and a cap 34 in the same manner as the housing shown in FIG. 8. The inner tube 31 and the flange 32 are formed in a one-piece construction.

The free piston 5 is resiliently supported on both sides at a neutral position by the coil springs 6 and 56 in the same manner as the free piston 5 shown in FIG. 8. The coil springs 6 and 56 constitute a spring S as shown in FIG. 10.

The sleeve 84 shown in FIG. 8 is omitted from this embodiment and the outer periphery of the free piston 5 slides directly on the inner periphery of the outer tube 33.

A bypass passage 42 is formed in the cap 34 and normally places the lower operating chamber R2 in communication with the lower pressure chamber R3B.

A peripheral annular groove 51a is provided on the outer periphery of the cylindrical section 51 of the free piston 5. The annular groove 51a is normally connected with the lower pressure chamber R3B through a plurality of through holes 51b formed on the lower end of the free piston 5. On the other hand, a plurality of orifices 33a connecting the inner side of the outer tube 33 and the lower operating chamber R2 through the wall face of the outer tube 33 of the housing 30 are provided.

When the free piston 5 is supported resiliently in a neutral position by the coil spring 6 and 56 or when the displacement of the free piston 5 does not exceed a predetermined range, the orifices 33 are formed at a position relative to the annular groove 51a. When the displacement of the free piston 5 exceeds a predetermined range, a part of the opening of the orifices 33a overlaps with the outer peripheral face of the cylindrical section 51 and the cross sectional area of the orifices 33a begins to decrease. When the free piston 5 displaces to the end of a stroke, in other words, when it abuts with the lower end of the inner tube 31 or the cap 34, the orifices 33a overlap completely with the outer peripheral face of the cylindrical section 51 of the free piston 5. The orifices 33a are closed in this state. Thus the orifices 33a, the annular groove 51a and the outer peripheral face of the cylindrical section 51 constitute the variable orifice 120.

In this embodiment, the third passage 4b connects the lower pressure chamber R3B and the lower operating chamber R2. The third passage 4b comprises a passage including the variable orifice 120, and a bypass passage 42 in parallel with the variable orifice 120.

When the resistance in one of the two passages gradually increases, the flow resistance of the working oil between the lower pressure chamber R3B and the lower operating chamber R2, in other words, the flow resistance of the third passage 4b gradually increases.

The predetermined range for the displacement of the free piston 5 from a neutral position is determined by the vertical width in the figure of the annular groove 51a and the position of the orifices 33a facing the annular groove 51a. When the free piston 5 reaches the end of a stroke, the orifices 33a become completely closed by the outer peripheral face of the cylindrical section 51. Thereafter the flow of working oil between the lower pressure chamber R3B and the lower operating chamber R2 is performed only via the bypass passage 42. At this time, the flow resistance in the third passage 4b is at a maximum.

Instead of providing a bypass passage 42 in the cap 34, it is possible to adapt the orifices 33a so that they do not close completely even when the free piston 5 reaches the end of the stroke.

In this embodiment, when the displacement of the free piston 5 from the neutral position is within a predetermined range, the damping force characteristics may be determined by the flow coefficients C1, C2, C3, the pressure receiving area A of the free piston 5 and the spring constant K of the spring 6.

The flow coefficient C1 depends on the flow resistance of the laminated leaf valve V1 and V2. The flow coefficient C2 depends on the flow resistance of the second passage 4a. The flow coefficient C3 depends on the resistance applied to the flow of oil by the variable orifice 120 and the bypass passage 42 constituting the third passage 4b.

When the displacement of the free piston 5 from a neutral position exceeds a predetermined range, the variable orifice 120 gradually increases the flow resistance of the third passage 4b. When the free piston 5 displaces to a limit towards the pressure chamber R3A or the pressure chamber R3B, in other words, when the free piston 5 reaches the end of the stroke, the flow resistance in the third passage 4b reaches a maximum. The displacement of the free piston 5 to the end of the stroke is evidence of large amplitude in the vibration acting on the shock absorber.

When the vibration frequency acting on the shock absorber is relatively high, the shock absorber produces a relatively low damping force in a predetermined range. When the free piston 5 exceeds the predetermined range, the flow resistance in the third passage 4b gradually increases. The displacement speed of the free piston 5 reduces and the flow amount of working oil in the passages 4a, 4b also decreases. As a result, the amount of working oil flowing through the first passage 3 increases. The produced damping force of the shock absorber gradually increases due to the large damping force produced by the laminated leaf valve V1, V2 constituting the damping force generating element 10.

After the free piston 5 reaches the end of the stroke, the flow amount of working oil in the passages 4a, 4b becomes zero. When the shock absorber continues the stroke, the working oil only flows in the first passage 3 and the shock absorber produces a maximum damping force.

Thus even when a large-amplitude vibration at which the free piston 5 displaces to the end of a stroke is input to the shock absorber, the damping force does not vary rapidly and increases smoothly in response to the stroke distance. These characteristics are equally applicable to an expansion stroke or a compression stroke of the shock absorber.

Even when a large-amplitude vibration having a high frequency is input, the shock absorber does not vary the generated damping force rapidly and it is possible to improve the riding comfort of the vehicle. In particular sharp variation in the damping force produces vibration in the vehicle body or the production of noise due to resonance with the bonnet of the vehicle. This embodiment avoids such phenomena and thus can improve the riding comfort of the vehicle.

In this shock absorber, the free piston 5 is supported resiliently at a neutral position by the coil spring 6 and 56 in the same manner as the first and second embodiments. Thus it is possible to produce a stable damping force in response to the stroke distance of the shock absorber. The variable orifice 120 varies the damping force in response to the displacement of the free piston 5. Therefore in this shock absorber, the stroke distance corresponds accurately to the damping force. Thus stable damping force characteristics are normally obtained.

Instead of providing a variable orifice 120 between the lower pressure chamber R3B and the lower operating chamber R2, an orifice may be provided between the upper pressure chamber R3A and the upper operating chamber R1, in other words, in the second passage 4a. It is possible to provide a variable orifice in both of the second passage 4a and the third passage 4b. Alternatively it is possible to provide the variable orifice 120 in one of the passages 4a and 4b and to provide a fixed orifice in the other passage.

Figure 12A:
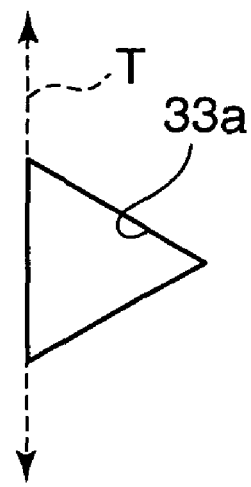
FIG. 12A-12C is a plan view showing the shape of an orifice in section according to the third embodiment of this invention.
Figure 12B:
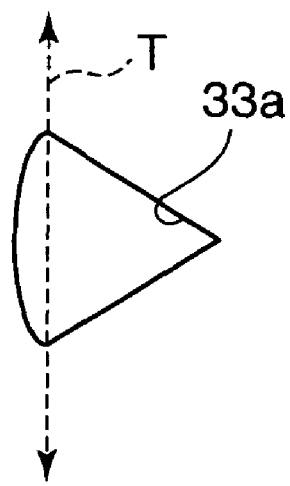
Figure 12C:
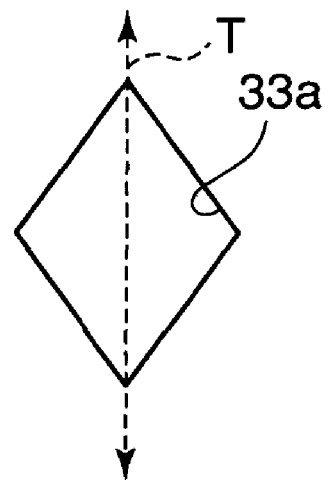

Referring to FIGS. 12A-12C, the cross sectional shape of the orifices 33a may have several variations.

The cross sectional shape of the orifices 33a may be triangular as shown in FIG. 12A, may be fan shaped as shown in FIG. 12B or may be diamond shaped as shown in FIG. 12C. In any of these cases, the ratio of the decrease in the sectional area of the passage of the orifices 33a becomes substantially fixed due to the fact that the respective acute-angle corners correspond to the direction T of displacement of the free piston 5. Consequently variation in the resulting damping force is balanced in comparison to a round cross sectional shape.

Figure 13:
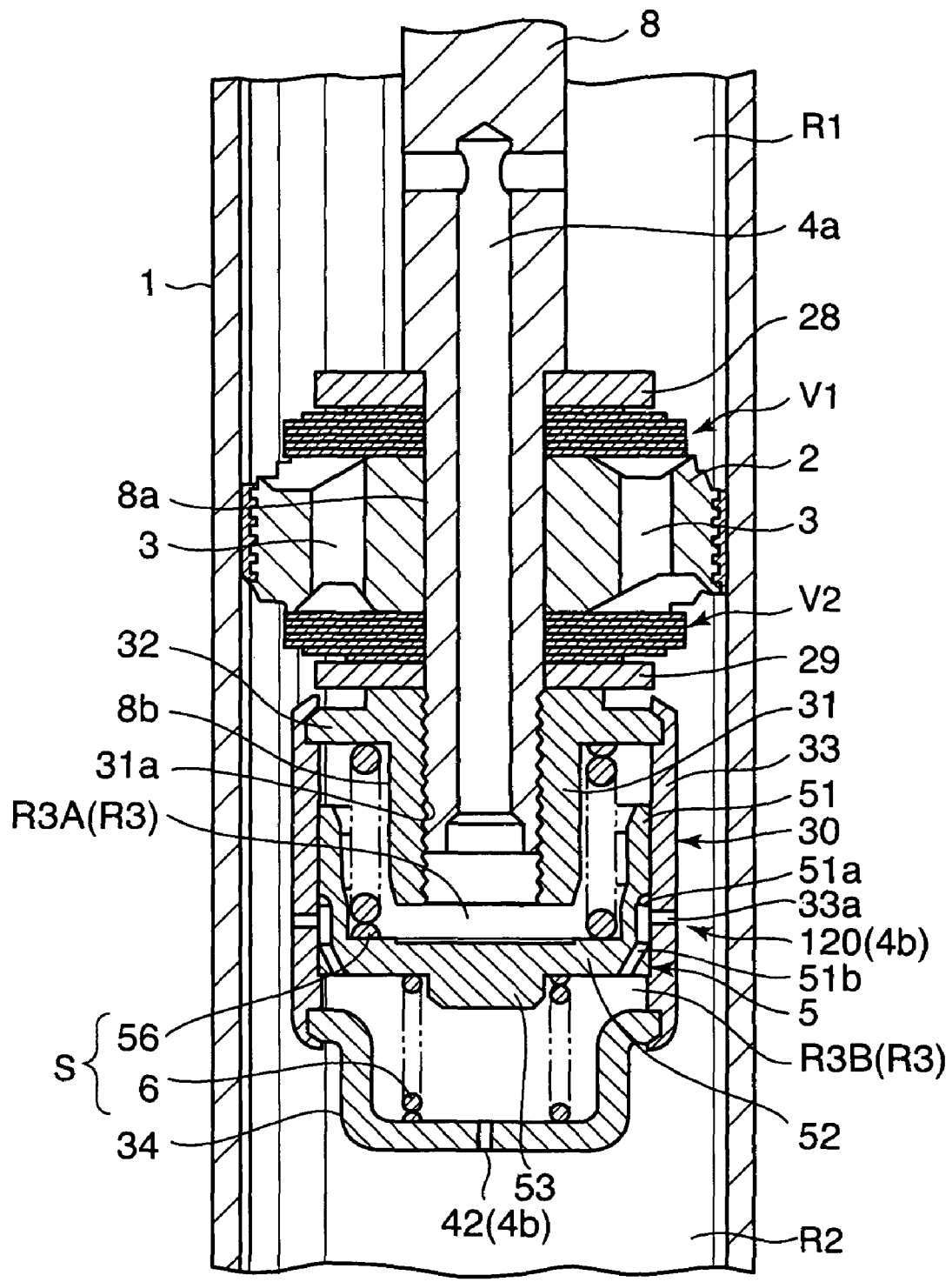
FIG. 13 is similar to FIG. 11 but shows a variation on through holes.

Referring to FIG. 13, there are several variations in the plurality of through holes 51b in the third embodiment.

Herein, each through hole 51b is inclined towards the central axis of the free piston 5. When the through holes 51b are inclined in this manner, it becomes easier to ensure the wall thickness of the peripheral cylindrical section 51 and to increase the strength of the free piston 5. This variation is preferable particularly in relation to reducing the size of the free piston 5.

Figure 14:
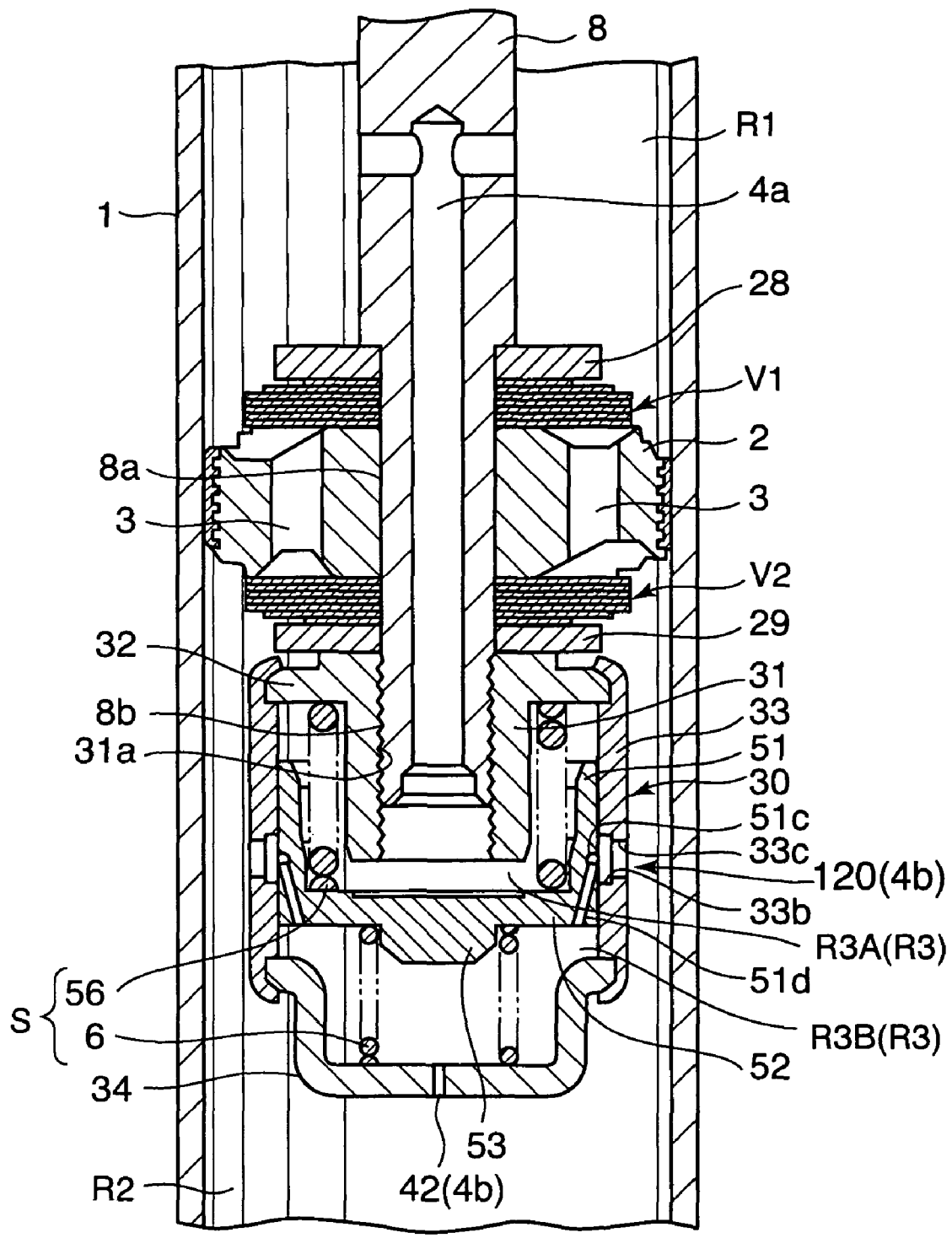
FIG. 14 is similar to FIG. 11 but shows a variation on the disposition of the orifices and an annular groove.

Referring to FIG. 14, a variation on the structure of the variable orifice 120 will be described with reference to the third embodiment.

Instead of constituting the variable orifice 120 from the orifices 33a, the annular groove 51a and the outer peripheral face of the cylindrical section 51, it is possible to form the variable orifice 120 from the orifices 51c, the annular groove 33b and the inner peripheral face of the outer tube 33 of the housing 30.

Lager diameter ports 33c are provided on the outer tube 33 of the housing 30 to connect the inner side and outer side of the housing 30 instead of the orifices 33a. An annular groove 33b is formed in a peripheral direction on the inner peripheral face of the outer tube 33. The annular groove 33b communicates with the opening of the ports 33c opened on the inner peripheral face of the outer tube 33. A plurality of orifices 51c are provided on the free piston 5.

The orifices 51 communicate with a lower pressure chamber R3B via a plurality of holes 51d formed on the lower end of the free piston 5.

The orifices 51c are provided in the outer periphery of the free piston 5. When the free piston 5 is resiliently supported in a neutral position by the coil spring 6 and 56, or when the displacement of the free piston 5 does not exceed a predetermined range, the entire surface of the opening of the orifices 51c is opened with respect to the ports 33b. When the displacement of the free piston 5 exceeds a predetermined range, a part of the opening of the orifices 51c overlaps with the inner peripheral face of the outer tube 33 and therefore the cross sectional area of the passage comprising the orifices begins to decrease. When the free piston 5 displaces up to the end of a stroke, in other words, when it abuts with the lower end of the inner tube 31 or the cap 34, the orifices 51c completely overlap with the inner peripheral face of the outer tube 33 and closes.

In this manner, the strength of the free piston 5 is increased as a result of providing the annular groove in the outer tube 33 rather than in the free piston 5. Thus this variation is particularly preferred when the size of the free piston 5 must be reduced.

Figure 15:
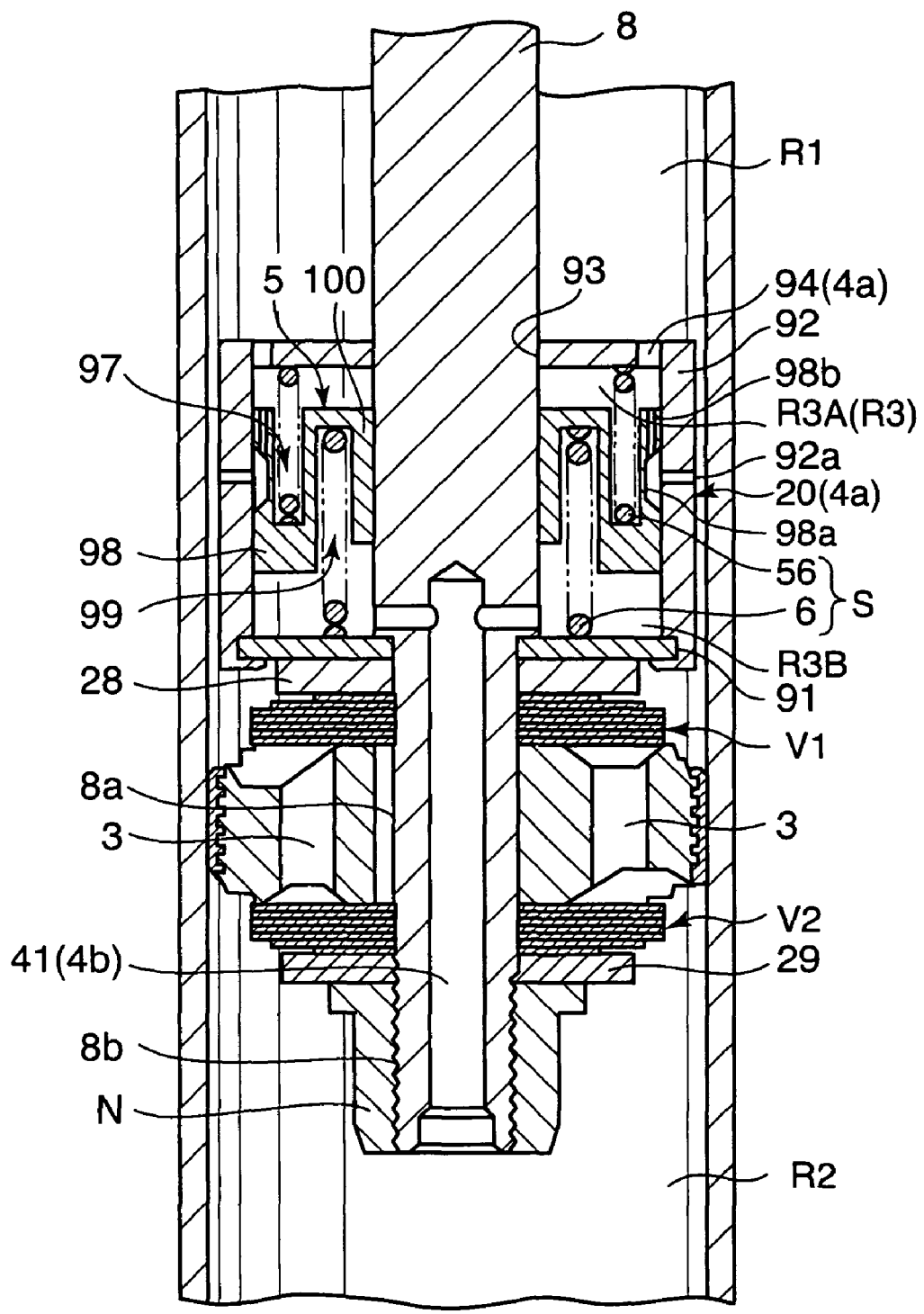
FIG. 15 is an enlarged transverse view of the main components of a shock absorber according to a fourth embodiment of this invention.

Referring to FIG. 15, a fourth embodiment of this invention will be described.

This embodiment is similar to the second embodiment however differs from the second embodiment in that a variable orifice 120 is provided in the second passage 4a connecting the upper operating chamber R1 and the upper pressure chamber R3A.

The variable orifice 120 comprises an annular groove 98a, orifices 92a and an inner peripheral face of the cylindrical member 92 of the housing 30.

The annular groove 98a is formed in the peripheral direction on the outer peripheral face of the outer peripheral section 98 of the free piston 5. The annular groove 98a normally communicates with the upper pressure chamber R3A through a plurality of through holes 98b formed on the upper end of the outer peripheral section 98.

The orifices 92a are provided in the wall face of the cylindrical member 92 and connect the upper operating chamber R1 with the inner section of the cylindrical member 92. The orifices 92a are formed at positions facing the annular groove 98a in a state where the free piston 5 is resiliently supported in a neutral position by the coil spring 6 and 56 or in a state where the displacement of the free piston 5 does not exceed a predetermined range. When the displacement of the free piston 5 exceeds the predetermined range, a part of the opening of the orifices 92a overlaps with the outer peripheral face of the outer peripheral section 98 and therefore the cross sectional area of the passage comprising the orifices 92a begins to decrease. When the free piston 5 displaces up to the end of a stroke, in other words, when it abuts with the upper end of the cylindrical member 92 or the plate member 91, the orifices 92a completely overlap with the outer peripheral face of the outer peripheral section 98 and close. In this embodiment, therefore, the orifices 92a, the annular groove 98a and the outer peripheral face of the outer peripheral section 98 of the free piston 5 constitute the variable orifice 120. Furthermore the holes 94 and the variable orifice 120 constitute the second passage 4a.

In this embodiment also, it is possible to form the orifices 92a on the outer peripheral section 98 of the free piston 5 and form the annular groove 98a on the inner peripheral face of the cylindrical member 92 of the housing 30. Alternatively it is possible to increase the strength of the outer peripheral section 98 of the free piston 5 by inclining the through holes 98b.

The contents of Tokugan 2005-164984 with a filing date of Jun. 6, 2005 in Japan, and Tokugan 2005-263221 with a filing date of Sep. 17, 2005 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, the shock absorber has been described in the above embodiments as a single-tube type. However this invention can be applied to a double-tube type shock absorber housing the outer side of the cylinder 1 in a tube and forming an annular reserve storing working oil between the cylinder 1 and the tube, or applied to a shock absorber provided with an independent reservoir on the outer side of the cylinder 1.

Furthermore it is possible to dispose the pressure chamber R3 on the outer side of the cylinder 1.

The embodiments of this invention in which an exclusive property or privilege is claimed are defined as follows:

What is claimed is:

1. A shock absorber interposed in parallel with a suspension spring between a vehicle wheel and a vehicle body of a vehicle, comprising:
   a cylinder;
   a main piston partitioning the cylinder into a first operating chamber and a second operating chamber;
   a first passage connecting the first operating chamber and the second operating chamber under a first flow resistance;
   two pressure chambers partitioned by a free piston, the free piston having a predetermined pressure receiving area;
   a second passage connecting the first operating chamber with one of the two pressure chambers under a second flow resistance without passing through the other of the two pressure chambers;
   a third passage connecting the second operating chamber with the other of the two pressure chambers under a third flow resistance without passing through the one of the two pressure chambers; and
   a spring having a predetermined spring constant and resiliently supporting the free piston in a predetermined neutral position,
   wherein
   the first flow resistance, the second flow resistance, the third flow resistance, the spring constant and the pressure receiving area are set so as to produce a large damping force for damping vibration of the main piston when a vibration frequency of the main piston is lower than a first frequency, produce a small damping force when the vibration frequency is higher than a second frequency that is greater than the first frequency, and produce, when the vibration frequency is higher than the first frequency and lower than the second frequency, a damping force that gradually decreases as the vibration frequency increases.

2. The shock absorber as defined in claim 1, wherein the first flow resistance, the second flow resistance, the third flow resistance, the spring constant and the pressure receiving area are set so that the first and second frequencies are set to be higher than an sprung resonance frequency of the vehicle and lower than an unsprung resonance frequency of the vehicle.

3. The shock absorber as defined in claim 1, wherein the spring comprises a coil spring disposed in the one of the two pressure chambers and a coil spring disposed in the other of the two pressure chambers such that the free piston is supported by the two coil springs in opposite directions, and the predetermined spring constant corresponds to an integrated spring constant of the two coil springs.

4. The shock absorber as defined in claim 1, wherein the two pressure chambers are formed on the inner side of a housing fixed to the main piston and are partitioned by a free piston housed in the housing.

5. The shock absorber as defined in claim 4, further comprising a piston rod protruding outwardly in an axial direction from the cylinder and connected to the main piston, the piston rod passing through the first operating chamber, the housing fixed to the main piston in the second operating chamber, the housing comprising an inner tube screwed on the piston rod, an outer tube covering the outer side of the inner tube and having an open end, a flange connecting the outer tube and the inner tube and, a cap closing the open end of the outer tube, one of the two pressure chambers formed between the flange and the free piston, the other of the two pressure chambers formed between the free piston and the cap, the second passage formed in the piston rod and connecting the first operating chamber with the one of the two pressure chambers, and the third passage comprising a hole formed in the cap connecting the second operating chamber and the other of the two pressure chambers.

6. The shock absorber as defined in claim 4, further comprising a piston rod protruding outwardly in an axial direction from the cylinder and connected to the main piston, the piston rod passing through the first operating chamber, the housing comprising an inner tube screwed on the piston rod, a closed-end outer tube covering the outer side of the inner tube, and a flange connecting the outer tube and the inner tube, one of the two pressure chambers formed between the flange and the free piston, the other of the two pressure chambers formed between a bottom face of the outer tube and the free piston, the second passage comprising a passage formed in the piston rod connecting the first operating chamber with the one of the two pressure chambers, the third passage comprising a hole formed in the bottom face of the outer tube, the inner tube and the flange formed in a one-piece construction, and the flange and the outer tube being mutually fixed by caulking.

7. The shock absorber as defined in claim 1, further comprising a variable orifice provided in either of the second passage and the third passage to increase a flow resistance in response to a displacement of the free piston from a neutral position.

8. The shock absorber as defined in claim 7, wherein a flow resistance of the variable orifice takes a maximum value when the free piston reaches an end of a stroke.

9. The shock absorber as defined in claim 7, wherein a flow resistance of the variable orifice maintains a fixed value when the displacement of the free piston remains in a predetermined range.

10. The shock absorber as defined in claim 7, wherein the variable orifice comprises an annular groove and a fixed orifice which undergo relative displacement in response to the displacement of the free piston, the annular groove and the fixed orifice being arranged such that the whole sectional area of the fixed orifice faces the annular groove as long as the free piston stays within a predetermined range from the neutral position, and the sectional area of the fixed orifice facing the annular groove decreases as the free piston displaces beyond the predetermined range.

11. The shock absorber as defined in claim 7, wherein the variable orifice is provided in the third passage and the shock absorber further comprises a bypass passage bypassing the variable orifice and connecting the second operating chamber with the other of the two pressure chambers.

12. The shock absorber as defined in claim 10, wherein a cross-sectional shape of the variable orifice is a polygon comprising acute corners oriented in a direction of the displacement of the free piston.

13. The shock absorber as defined in claim 1, wherein the third passage comprises a hole provided in a portion of the free piston, the hole inclined with respect to the direction of the displacement of the free piston.

14. The shock absorber as defined in claim 1, wherein the first flow resistance is set to be larger than the second flow resistance and the third flow resistance.

15. The shock absorber as defined in claim 7, wherein the variable orifice is not provided in the second passage.

16. The shock absorber as defined in claim 15, wherein a fixed orifice is provided in the second passage.

17. The shock absorber as defined in claim 7, wherein the variable orifice is not provided in the third passage.

18. The shock absorber as defined in claim 17, wherein a fixed orifice is provided in the third passage.

* * * * *